United States Patent [19]

Stage

[11] 3,792,843
[45] Feb. 19, 1974

[54] PERFORATED-TRAY COLUMN

[76] Inventor: Hermann Stage, Emdener Strasse 10, Cologne, Germany

[22] Filed: Dec. 27, 1971

[21] Appl. No.: 212,277

[30] Foreign Application Priority Data
Dec. 28, 1971 Germany............................ 2063937

[52] U.S. Cl............. 261/148, 23/270.5, 196/14.52, 202/158, 261/114 R, 261/153
[51] Int. Cl................................................ B01f 3/04
[58] Field of Search..................... 261/114, 146–148, 261/153, 149; 165/116, 174; 23/270.5; 202/158; 196/14.52

[56] References Cited
UNITED STATES PATENTS

| | | | |
|---|---|---|---|
| 3,215,504 | 11/1965 | Hagbarth | 261/148 UX |
| 1,328,259 | 1/1920 | Barbet | 261/148 X |
| 1,567,458 | 12/1925 | Newton | 261/148 UX |
| 699,572 | 5/1902 | Rocca | 261/148 UX |
| 3,591,342 | 7/1971 | Lerolle et al. | 261/148 X |
| 249,528 | 11/1881 | Isbell | 261/153 |
| 1,763,508 | 6/1930 | Fowler | 261/153 |

FOREIGN PATENTS OR APPLICATIONS

| | | | |
|---|---|---|---|
| 961,421 | 6/1964 | Great Britain | 261/148 |
| 137,935 | 1/1960 | U.S.S.R. | 165/116 |

*Primary Examiner*—Tim R. Miles
*Assistant Examiner*—Vincent Gifford
*Attorney, Agent, or Firm*—Michael S. Striker

[57] ABSTRACT

A plurality of trays are vertically superimposed and across the trays extend heat-exchange pipes each of which covers a portion of the respective tray surface. The trays are provided with perforations and the combined cross-sectional area of perforations in the surface portions of the respective trays which are covered by the heat-exchange pipes is smaller than the combined cross-sectional area of perforations in the remaining portions, and may be as small as zero.

3 Claims, 2 Drawing Figures

PERFORATED-TRAY COLUMN

BACKGROUND OF THE INVENTION

The present invention relates generally to a column, and more particularly to a perforated-tray column.

Perforated-tray columns are used in various applications, for instance as fractionating columns. The employment of columns for this purpose is so well known that a detailed description is not believed to be necessary of their general construction and operation. It is already known to use in certain applications of such columns heat-exchange pipes which are located above and extend across portions of the respective perforated trays of the column, of which trays the column may have any number which has been determined as necessary for the particular purpose. These pipes are of course for heat-exchange purposes and the concept behind their use is to exchange heat with the liquid which flows through the column and, in so doing, flows over and through the respective perforated trays thereof. Depending upon the requirements of a given situation, a medium—preferably a liquid—is circulated through these heat-exchange pipes for the purpose of either heating or cooling the liquid passing through the column. For instance, when the reaction or absorption of the liquid passing through the column causes a positive temperature increase to take place which must be overcome, then a cooling medium is passed through the heat-exchange pipes. Conversely, if it is necessary to provide for an increased temperature in order to obtain or support the reaction or absorption of a liquid passing through the column, then a heating medium is circulated through the heat-exchange pipes. By way of example it is pointed out that a positive temperature increase, requiring cooling via a medium passed through the heat-exchange pipes, is obtained for example during the formaldehyde absorption in water in formaldehyde synthesis from methanol.

The prior-art constructions of this type have the heat-exchange pipes disposed partially or completely in the liquid passing through the column and flowing over the respective perforated trays thereof. The gaseous phase passing through the perforated trays assures that the liquid on the respective tray will flow about the heat-exchange pipes in a lively, turbulent pattern, so that an effective heat exchange is obtained. However, it has been found disadvantageous that the gaseous phase under these circumstances undergoes a rather significant pressure drop.

SUMMARY OF THE INVENTION

It is, accordingly, an object of the present invention to overcome the disadvantages of the prior art.

More particularly it is an object of the present invention to provide an improved perforated-tray column which is not possessed of these disadvantages.

Still more particularly the invention has as an object the provision of a perforated-tray column in which the advantages of the prior art are fully maintained whereas the undesirable pressure drop in the gaseous phase is descreased substantially.

A solution to these and other objects which will become apparent hereafter, is provided in the invention with a perforated-tray column which, briefly stated, comprises at least one tray provided with perforations, and at least one heat-exchange pipe extending across a first surface portion of the tray. The perforations in this portion have a first combined cross-sectional area which is smaller than the second combined cross-sectional area of the perforations in the remainder of the tray.

According to a currently preferred embodiment of the invention the first combined cross-sectional area may equal zero.

It is already known to provide the perforations in such perforated-tray columns in rows which are more or less parallel. This is, of course, possible also in accordance with the present invention and, if such an arrangement is chosen, then it is advantageous according to a further concept of the invention that the surface area of the respective tray located between the two rows of perforations which flank a respective heat-exchange pipe be equal to at least 50 percent and at most 120 percent of the aforementioned first surface portion over which the heat-exchange pipe extends, that is of the surface area flanked by two second surface portions of the tray and which is obtained by projecting the outline of the pipe onto the tray. Preferably the surface area should be between 70 percent and 90 percent.

Of course, if more than one heat-exchange pipe is associated with a single perforated tray, and if only one or some but not all of the surface portions of the tray over which heat-exchange pipes extend, are in accordance with the present invention, an improvement over the prior art is already obtained. In other words, this improvement is obtained even if in the remaining surface portions the combined cross-sectional areas of the perforations provided in them is equal to the combined cross-sectional areas of perforations in the surface portions over which the heat-exchange pipes do not extend. Furthermore, it is evident that the total combined cross-sectional areas of all the perforations of a tray must of course be sufficient to permit the desired operational effect.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
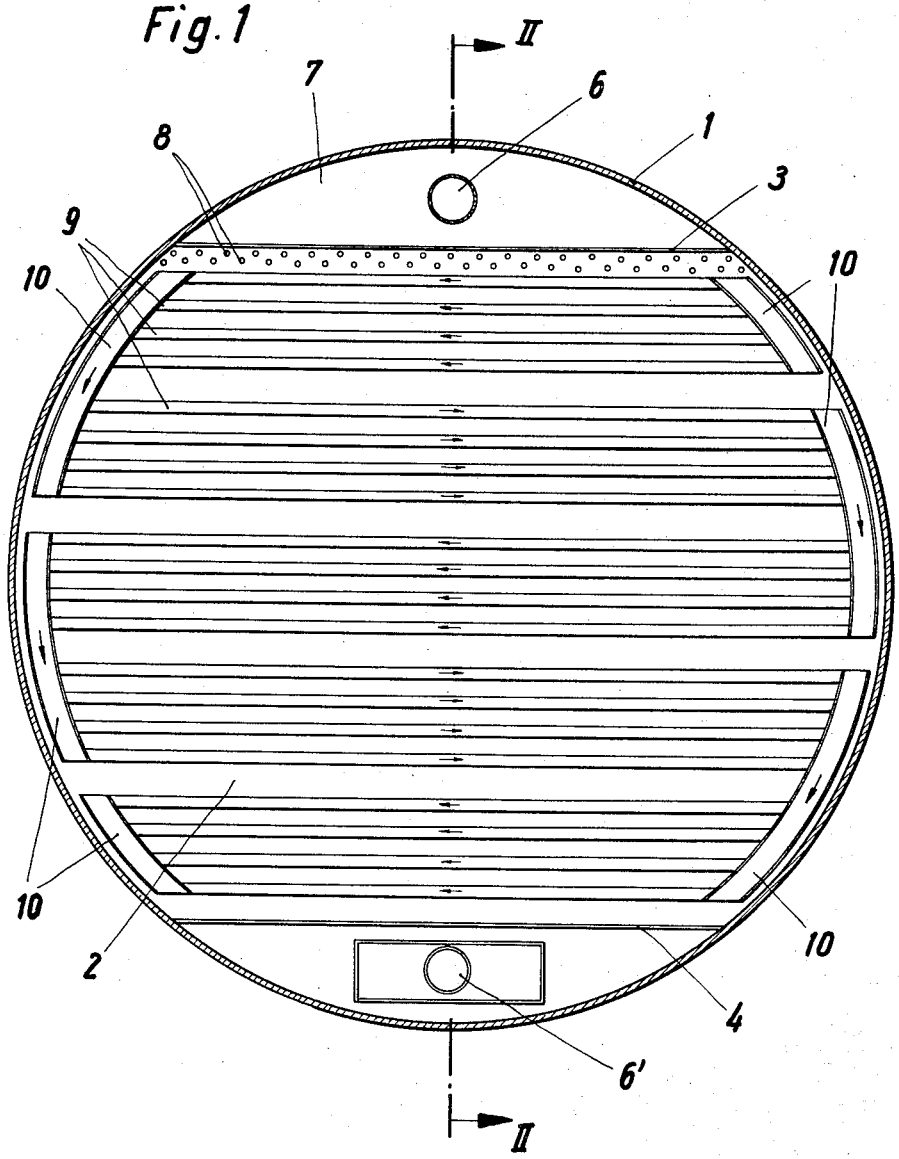
FIG. 1 is a top-plan view of a perforated tray according to the present invention with heat-exchange pipes extending thereacross.
Figure 2:
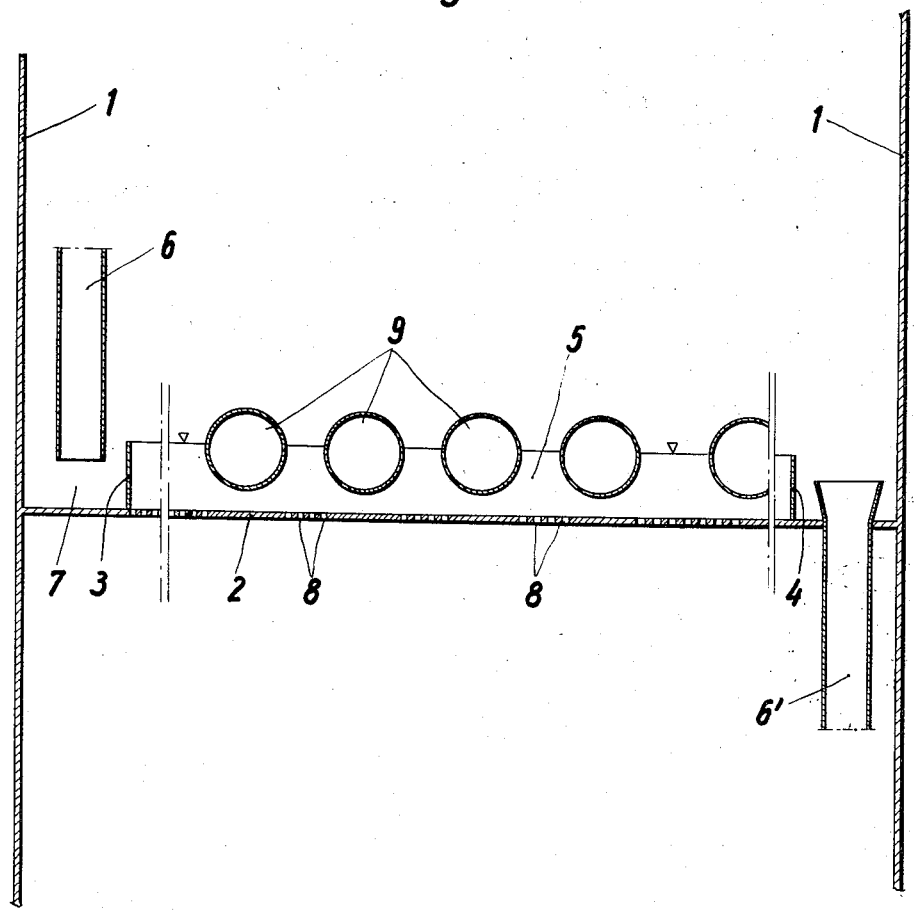
FIG. 2 is a simplified vertical section taken on line II—II of FIG. 1 with the heat-exchange pipes being shown on a larger scale than in FIG. 1 for explanatory purposes.

Discussing now the drawing in detail it will be seen that in FIGS. 1 and 2 I have diagrammatically illustrated the outer circumferential wall 1 of a perforated tray column of otherwise conventional construction. One of the perforated trays, of which a plurality will ordinarily be arranged in vertical superimposition and with spacing, is identified with reference numeral 2, and will in conventional manner be connected with the wall 1, although this has not been illustrated for the sake of clarity. Also, the usual supports which prevent downward bending of the trays have been omitted for the sake of clarity.

The tray 2 is constructed as a transverse-flow tray and has an inflow weir 3 and an outflow weir 4, through which the liquid passing through the column respectively enters onto and leaves the tray 2. The liquid of course flows from a higher tray towards a lower tray in downward direction of the column. It enters onto each tray 2 from the outflow weir 4 of the superimposed tray via the supply conduit 6, and flows over the inflow weir 3 after being collected in the trough or space 7. The tray itself is provided with perforations 8 for passage of a gaseous phase, and the liquid flows across from the weir 3 to the outflow weir 4 to leave the tray 2 through the outflow conduit 6' and to move downwardly to the subjacent tray, into the inflow weir 3 thereof.

As FIG. 2 shows, the inflow weir 3 of a tray 2 is located slightly higher than the outflow weir 4 in order to obtain a flow gradient. The gaseous phase passes through the holes or perforations 8.

It should be pointed out that in some circumstances it is advantageous to eliminate the outflow weir 4 and the outflow conduit 6' so that the liquid can flow down over a marginally arranged vertical rim or the like and thus move onto the next-lower tray 2.

Extending across the trays 2, upwardly spaced out of contact with the same, are heat-exchange pipes 9 which extend substantially parallel with the elongation of the weirs 3 and 4. In the illustrated embodiment they are connected by connecting pipes 10 (see FIG. 1 where the flow of heat-exchange fluid through the pipes 9 and 10 is indicated by arrows) into groups of four.

In order to simplify the illustration and avoid confusion, FIG. 1 shows perforations 8 only in the immediate region of the weir 3, and within the surface area resulting from a projection of the pipes 9 onto the surface of the tray 2 no perforations 8 are located in this embodiment.

In the illustrated embodiment the perforations 8 are arranged in rows which are spaced preferably by approximately double the distance between the consecutive perforations in each row, with the distance between such consecutive perforations being between substantially 3 and 8 mm, preferably between 4 and 6 mm. It is advantageous if each perforation in one row is located substantially midway between two consecutive perforations of an adjacent row. The flow speed of the gaseous phase on entry through the perforated tray amounts to between substantially 8 and 20 m/sec, preferably between substantially 10–16 m/sec. The diameter of the heat-exchange pipes 9, which latter have been shown enlarged in FIG. 2 in order to illustrate the invention more clearly, is between substantially 20 and 40 mm, preferably between substantially 25 and 38 mm. The height of the weirs 3 and 4 is between substantially 15 and 30 mm.

It will be appreciated that the advantage of the present invention over what is known from the art resides in the fact that the pressure drop of the gaseous phase which flows upwardly through the perforations 8 of the respective trays 2, is substantially lower above each tray 2 than in the known constructions of the prior art. At the same time as this is achieved, however, the present invention provides for the same degree of effectiveness of heat exchange which is known from the prior art, that is the present invention provides an advantage without having to accept any disadvantages. The lower pressure drop over the individual trays 2 assures that less energy is required for providing the gaseous phase so that the operational expenses for operating a column constructed in accordance with the present invention can be reduced significantly, a consideration which is becoming more and more important.

The present invention provides the above-outlined advantages in a very surprising manner, because heretofore it has always been throught by the experts that the provision of apertures in the portions of the trays over which the heat-exchange pipes extend, was very important in order to obtain a particularly effective flow of the liquid passing over the trays, into contact with the heat-exchange pipes with the aid of the gaseous phase. In other words, it was thought that in order to obtain optimum heat-exchange effectiveness the provision of the holes or perforations in the areas beneath the heat-exchange pipes was of particular importance. The present invention shows that, very surprisingly, the heretofore held opinion was incorrect and that the heat-exchange effectiveness in a column according to the present invention is at least as good as in the columns according to the prior art, whereas the pressure drop of the gaseous phase above the respective trays 2 is significantly lower and thus permits lower expenses in the operation of the column.

It will be understood that each of the elements described above, or two or more together, may also find a useful application in other types of constructions differing from the types described above.

While the invention has been illustrated and described as embodied in a perforated-tray column, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a perforated-tray column, in combination, at least one tray provided with perforations, said tray having a first surface portion, and two second surface portions flanking said first surface portion; and a heat-exchange pipe extending across said first surface portion intermediate said second surface portions and upwardly spaced from said tray, said pipe having a diameter larger than the spacing between adjacent ones of said perforations, and the perforations in said first surface portion having a first combined cross-sectional area which is smaller than the second combined cross-sectional area of the perforations in the remainder of said tray, the combined cross-section of the perforations in said first surface portion being smaller per unit surface area of said tray than the combined cross-section of the perforations in either of said second surface portions.

2. In a column as defined in claim 1, said perforations being arranged in at least substantially parallel rows and wherein a pair of rows flank said pipe; and wherein the surface area of said tray between said pair of rows is equal to at least 50 percent of the surface area of said first portion.

3. In a column as defined in claim 2, wherein said surface area between said pair of rows equals between 70 percent and 90 percent of the surface area of said first portion.

* * * * *